April 2, 1963     J. H. PLESS     3,083,470
SEASONING TIMBER
Filed Feb. 3, 1958     2 Sheets-Sheet 1
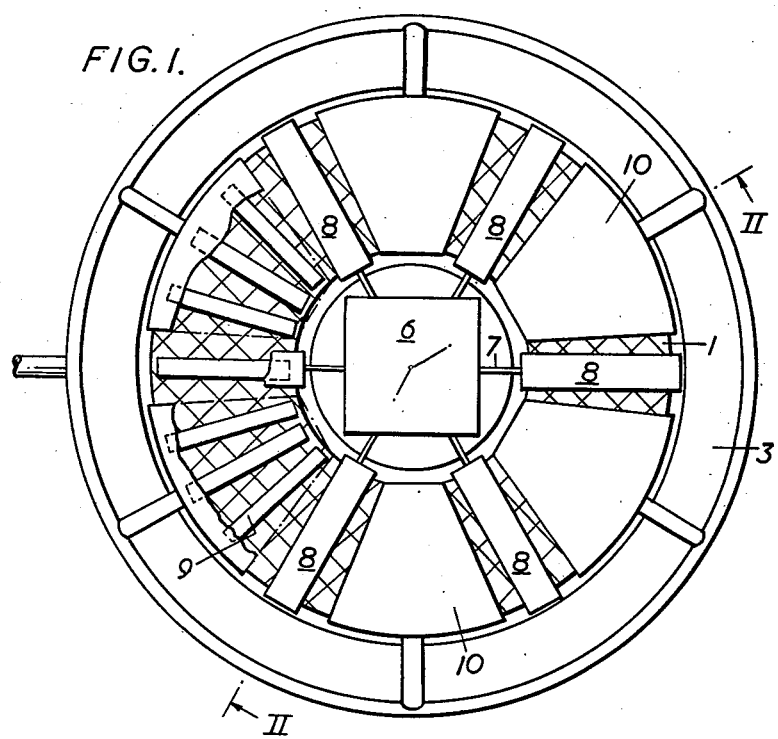
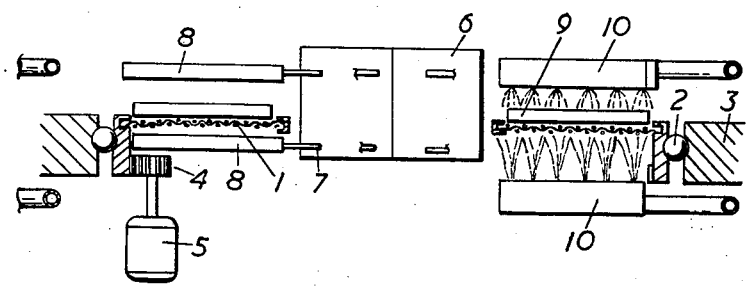
Inventor
John Henry Pless
By
Bailey, Stephens & Huetig
Attorneys April 2, 1963   J. H. PLESS   3,083,470
SEASONING TIMBER
Filed Feb. 3, 1958   2 Sheets-Sheet 2
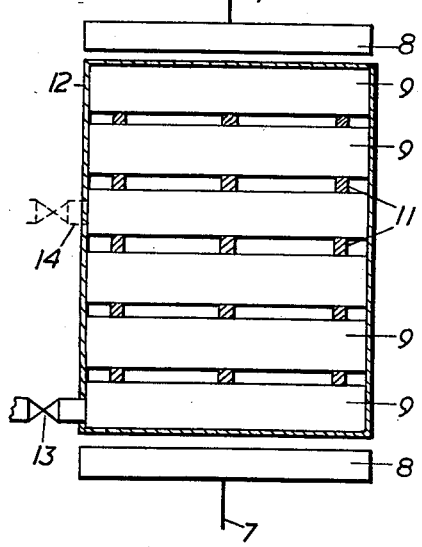
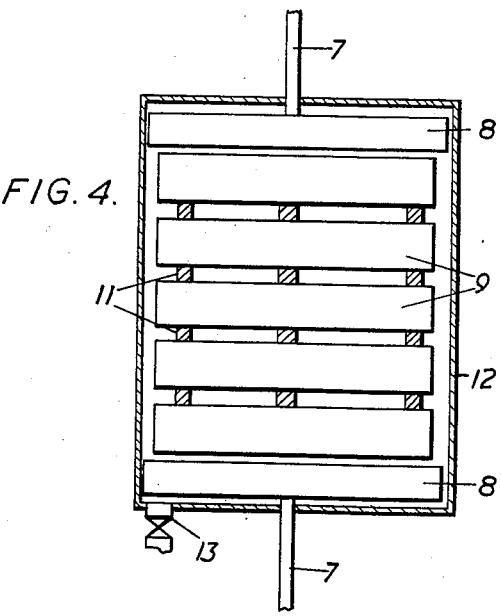
Inventor
John Henry Pless
By
Bailey, Stephens & Huettig
Attorneys

3,083,470
SEASONING TIMBER

John Henry Pless, London, England, assignor to John H. Stubber, Gloucestershire, Langshaw Rowland, Gresford, Denbighshire, and John H. Pless, London, England Filed Feb. 3, 1958, Ser. No. 712,891
Claims priority, application Great Britain Feb. 8, 1957
1 Claim. (Cl. 34—1)

The invention relates to a process for seasoning timber.

The process of the invention comprises intermittently exposing the timber to radio frequency dielectric heating whilst checking the rate of evaporation from the surfaces thereof.

Such a process enables timber to be rapidly seasoned without damage to the timber due to cracking or distortion of the surfaces, honeycombing or case hardening.

In carrying the process into effect the surfaces of the timber may be intermittently sprayed with or dipped in water or an aqueous solution to control the rate of evaporation therefrom whilst the timber is being heated. Instead of spraying, dipping water or an aqueous solution of sodium chloride, glycol, glycerol or urea may conveniently be used. In this form of process the timber may be conveniently moved through successive gaps between pairs of electrodes the spraying or dipping being carried out between adjacent pairs of electrodes.

In an alternative form of process the timber is enclosed in an impervious container having one or more steam vents therein to control the humidity and pressure and hence provide a moist atmosphere surrounding the timber and thus to control the rate of evaporation from the surface thereof. If desired the container may have one or more inlet passages to provide for admission of an additional steam. The container may conveniently have the form of a closed container with one or more circular steam vents.

During the process of the invention the temperature at the centre of the timber may be maintained substantially higher relative to the temperature of the surface than is normally possible in a conventional kiln. At the same time the moisture gradient between the centre of the timber and the surface is controlled. Water is accordingly continuously driven from the centre towards the surface which is maintained relatively moist.

In the accompanying drawings there are shown by way of example three forms of apparatus suitable for carrying out the process of the invention.

In the drawings, FIGURES 1 and 2, show in plan and section a form of apparatus suitable for the seasoning of single planks carried on a rotating table whilst FIGURES 3 and 4 show in section different forms of apparatus in which the timbers are treated in a stack and surrounded by a steam retaining envelope.

Referring first to FIGURES 1 and 2, the apparatus comprises a circular rotating table 1 mainly made of wire mesh or similar openwork material and mounted through ball bearings 2 in an enclosing stationary ring 3 and driven through gearing 4 from an electric motor 5. At the centre of the table a stationary generator 6 is provided with connections 7 to electrodes 8 arranged radially in pairs above and below the table 1. Planks 9 for seasoning are arranged radially around the table 1. Spraying heads 10 are arranged above and below the table 1 between adjacent pairs of electrodes 8.

In the use of such an apparatus after the planks 9 have been put in position and the generator 6 and the driving motor 5 switched on, each plank is first carried into the gap between one pair of electrodes 8 and then into the gap between a pair of spraying heads 10 from which it is sprayed with water or one of the aqueous solutions mentioned above. In this way the timber is first heated by application of radio frequency dielectric heating and then sprayed to control the rate of evaporation from the surface thereof. When the process is substantially complete the supply to the spray heads is discontinued and the planks removed shortly afterwards.

In the apparatus shown in FIGURE 3, the planks 9 are arranged in stacks, each plank being separated from the adjacent plank by spacers 11 and the stack enclosed in an impervious envelope of dielectric material 12 such as silicon bonded glass fibre. The container has a steam vent 13 and may also have a steam supply inlet 14 as shown in chain lines. The electrodes 8 are located outside the container 12.

In carrying the invention into effect the planks 9 and spacers 11 are inserted in the envelope 12 which is then closed by an end cover (not shown) and placed in position between the electrodes 8 which are intermittently energised so that the timber stack is heated by radio frequency dielectric heating whilst the atmosphere surrounding the timber is maintained moist. Additional reduction of the rate of surface evaporation may be produced by introducing the steam into the envelope.

The apparatus shown in FIGURE 4 is similar but the electrodes 8 are arranged within the envelope 12 which accordingly does not need to be made of dielectric material.

Examples of timing cycles and power imputs are as follows: For hard woods in planks of 1 to 3 inches thickness the preferred timing is 30 seconds with dielectric heating "on" and three minutes "off." When drying soft wood the cycle may comprise an "on" period of one minute followed by an "off" period of one minute.

The invention is further illustrated by the following examples.

Example 1

A block of oak of dimensions 6 in. x 6 in. x 1 in. was placed in a chamber with dielectric electrodes of 12 in. x 12 in. size on opposite sides thereof. An electric current generated by a radio frequency oscillator having an output of 1500 watts at a frequency of 10,000 megacycles was applied to the electrodes intermittently. The first such application lasted 90 seconds to provide for initial heating of the block, this being followed by an interruption of 2 minutes during which the block was sprayed with ¼ fluid oz. of water at 60° F. Successive heatings for a period of 30 seconds followed, each being succeeded by an interruption of 2 minutes during which the timber was again sprayed for 30 seconds with ¼ fluid oz. of water at 60° F. This cycle was repeated 20 times terminating with a heating period of 30 seconds. The moisture content of the timber was thereby reduced from 64% to 38%.

Example 2

Two blocks of deal 6 in. x 6 in. x 3 in. spaced apart ¼ inch were placed in a vented chamber made of fibreglass and placed between electrodes of dimensions 12 x 12 inches.

The chamber and the blocks were subjected to intermittent dielectric heating by applying a current for 11 periods of 1 minute each interrupted by 10 periods of 1 minute each, the surfaces of the blocks being accordingly enveloped in steam due solely to the heating of the blocks.

At each heating period the output of the oscillator progressively decreased from 2 kw. R.F. to 0.9 kw. R.F. due to the fall in moisture content of the timber from an initial value of 43% in one block and 34% in the other to a uniform final value of 17%.

I claim:

A process for seasoning timber comprising intermittently dielectrically heating said timber for given periods of time, and spraying the surfaces of said timber with water to control the rate of the evaporation of moisture therefrom to keep said surfaces moist and for at least equal periods of time alternated with the given periods of dielectric heating.

References Cited in the file of this patent

UNITED STATES PATENTS

| | | |
|---|---|---|
| 1,166,819 | Derby et al. | Jan. 4, 1916 |
| 1,577,044 | Mason | Mar. 16, 1926 |
| 2,408,434 | Mann et al. | Oct. 1, 1946 |
| 2,428,615 | Brown | Oct. 7, 1947 |
| 2,567,983 | Wood | Sept. 18, 1951 |
| 2,949,677 | Cameron | Aug. 23, 1960 |

OTHER REFERENCES

Ishaq: High Frequency Drying of Wood, Southern Lumberman, December 15, 1947.

Forest Products Laboratory, report No. 1665-7 (revised). High Frequency Dielectric Heating, Madison, Wisconsin.

Russell: Drying and Laminating by Radio Frequency, The Timberman, August, 1944, page 38.